United States Patent [19]

Laprade et al.

[11] 4,022,171

[45] May 10, 1977

[54] PROCESS AND DEVICE FOR CONTROLLING AN ELECTRIC VALVE FOR REGULATING THE SUPPLY OF THE FUEL AIR MIXTURE TO INTERNAL COMBUSTION ENGINES

[76] Inventors: Bernard Laprade; Xavier Laprada, both of 64 260 Arudy; Pierre Gele, 3, rue Vaussenat, 65 000 Tarbes, all of France

[22] Filed: May 19, 1975

[21] Appl. No.: 578,987

[30] Foreign Application Priority Data

May 24, 1974 France .............................. 74.18028

[52] U.S. Cl. ........................................ 123/119 EC
[51] Int. Cl.² ..................... F02B 75/10; F02B 3/00; F02M 37/00
[58] Field of Search ....... 123/119 E, 119 R, 32 EA, 123/119 DB, 119 D, 124 B, 124 R, 124 A, 119 EC; 60/276

[56] References Cited

UNITED STATES PATENTS

| | | | |
|---|---|---|---|
| 3,601,106 | 8/1971 | Narajima | 123/119 D |
| 3,616,274 | 10/1971 | Eddy | 123/119 E X |
| 3,675,632 | 7/1972 | Nakajima | 123/119 D |
| 3,745,768 | 7/1973 | Zechnazl et al. | 123/119 R X |
| 3,759,232 | 9/1973 | Wahl et al. | 123/119 DB |
| 3,827,237 | 8/1974 | Linder et al. | 123/119 R X |
| 3,842,600 | 10/1974 | Nakajima et al. | 60/276 |
| 3,871,338 | 3/1975 | Schmidt et al. | 60/276 |
| 3,910,240 | 10/1975 | Omori et al. | 60/276 X |
| 3,919,983 | 11/1975 | Wahl et al. | 60/276 X |

Primary Examiner—Wendell E. Burns
Attorney, Agent, or Firm—Finnegan, Henderson, Farabow & Garrett

[57] ABSTRACT

A method and device for regulating the composition of a fuel air mixture supplied to an internal combustion engine by means of a valve in a secondary air inlet opening into the intake pipe of the internal combustion engine. A detector measures the composition of the exhaust gas and supplies a signal proportional to the oxygen or carbon monoxide content of the gas, this signal is compared with a stabilized voltage, the difference thus obtained is compared with a signal consisting of triangular pulses of a fixed amplitude and the signal thus obtained is used to control the valve after amplification, the duration of the signal defining the time of opening of the valve.

16 Claims, 4 Drawing Figures

PROCESS AND DEVICE FOR CONTROLLING AN ELECTRIC VALVE FOR REGULATING THE SUPPLY OF THE FUEL AIR MIXTURE TO INTERNAL COMBUSTION ENGINES

BACKGROUND OF THE INVENTION

1. Field of the Invention

The present invention relates to a method and apparatus for regulating the composition of a fuel air mixture supplied to an internal combustion engine.

2. Description of the Prior Art

It is known that the composition of the mixture of fuel and air supplied to internal combustion engines can be adjusted by means of a secondary air inlet in the intake pipe, this air inlet being controlled by a valve which is completely or partly controlled by information supplied from a detector which measures the oxygen content (or CO content) or more generally the composition of the exhaust gas.

The practical realization of such devices, however, poses complex problems. An internal combustion engine operates over a wide range of outputs depending mainly on its speed of rotation and above all on the intake pressure. It follows that a regulating system must respond equally over a considerable output range to ensure that it will make the necessary correction no matter what the engine output while at the same time remaining sufficiently sensitive to respond with high precision, and its response time must also be compatible with the engine speed.

Such a system must ensure an accuracy of regulation with a percentage of error below 2%.

Furthermore, the introduction of secondary air as a regulating factor must not affect the homogeneity of the mixture, otherwise it would impair complete combustion in the cylinders of the engine.

SUMMARY OF THE INVENTION

It is an object of the present invention to overcome these difficulties and provide a method and a device for controlling such a valve.

According to the process of the invention, the voltage from a detector is compared with a voltage which is stabilized at a reference value, the difference obtained being compared with pulses from a pulse generator which generates triangular pulses of fixed amplitude and frequency so that dogtooth pulses are obtained which have a constant repetition frequency and an amplitude which varies as a function of the variations of the voltage from the probe between two predetermined limits while beyond these limits the valve is either completely open or completely closed.

The device according to the invention comprises a detector situated in the engine exhaust and providing a variable voltage which is a function of the oxygen content of the exhaust gas, a stabilized voltage source, a difference amplifying comparator which produces a voltage proportional to the difference between the two above mentioned voltages, a pulse generator which generates triangular impulses of constant frequency and amplitude and a comparator which generates dogtooth pulses. This comparator receives the voltage from the difference amplifying comparator and the triangular pulses. For all differences smaller in absolute value than the amplitude of the triangular pulses, the dogtooth generating comparator produces a dogtooth shaped signal the repetition frequency of which is equal to that of the triangular pulses and the amplitude or duration of which varies as a function of the voltage supplied from the difference amplifying comparator; for all differences of greater absolute value, the dogtooth generator produces a permanent signal. The device in addition comprises a valve which is controlled by the aforesaid signal and which itseld controls an auxiliary air inlet which opens into the intake pipe downstream of the device which supplies the mixture of air and fuel.

The following effects are thereby obtained:

A threshold value below which the electric valve remains closed, this threshold being defined by the selected stabilized voltage and itself determining the oxygen content (or CO content) starting from which the mixture of air and fuel will be subject to a correction;

a zone of progressive correction corresponding to the values of the voltage difference which are smaller than the amplitude of the triangular pulses;

a correction zone in which the electric valve remains completely open or completely closed, this zone corresponding to the values of voltage differences which are greater than the amplitude of the triangular pulses.

According to a preferred embodiment of the invention, the stabilized voltage, the amplitude of the triangular pulses and the degree of amplification of the pulses are adjustable parameters so that it is possible to adjust the initial threshold and the zone of progressive correction and to adjust the power as a function of the electric valve used.

According to the invention, the frequency of recurrence will preferably be between about 5 and 20 Hertz and preferably of the order of 8 to 15 Hertz, which corresponds to average engine speeds (1000 to 2000 revs.). The devices described above are preferably used in combination with devices which come into operation when the engine is throttled down or at full acceleration, such as a contact maker designed to block the electric valve in the closed position under these conditions.

The contact maker, for example, may be designed to be actuated when the position of the accelerator pedal or the main throttle valve corresponds to the operation of the engine at low speed or full acceleration.

An adjustable valve is advantageously situated in the secondary air conduit to introduce a charge loss which increases with increasing pressure drop in the intake pipe.

This arrangement which enables the driving pressure in the secondary air conduit to be regulated may be in the form of a valve which is mechanically connected to the main butterfly valve of the carburettor so that it closes at the same time as this valve.

It may also be controlled by the pressure drop in the intake pipe by means of a membrane capsule. The invention may also be realized in the form of a carburettor or a device for supplying the fuel air mixture, comprising a by-pass or an auxiliary air inlet controlled by an electric valve which in turn is conrolled by dogtooth pulses which have a constant frequency of recurrence and a variable duration which is a function of the information supplied from a detector arranged in the exhaust pipe as described above.

BRIEF DESCRIPTION OF THE DRAWINGS

In the accompanying drawings

DESCRIPTION OF THE PREFERRED EMBODIMENT

Figure 1:
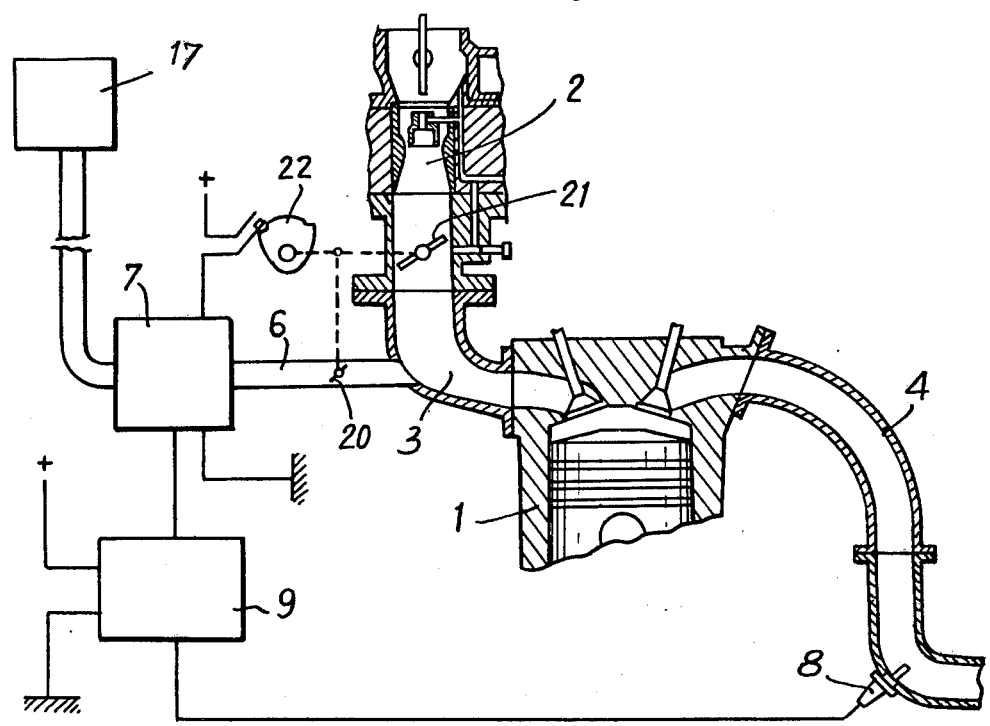
FIG. 1 is a schematic view of an embodiment of the device according to the present invention.

Referring to FIG. 1, the device according to the invention comprises a secondary air inlet 6 opening into the intake pipe 3 and designed to correct the composition of the air fuel mixture supplied to the cylinders 1 by the carburettor 2 or other supply system, the inlet 6 being controlled by an electric valve 7 which is controlled by an electric signal conveying information supplied by a probe 8, situated in the exhaust pipe 4, this information being converted by electronic circuitry, 9.

Figure 2:
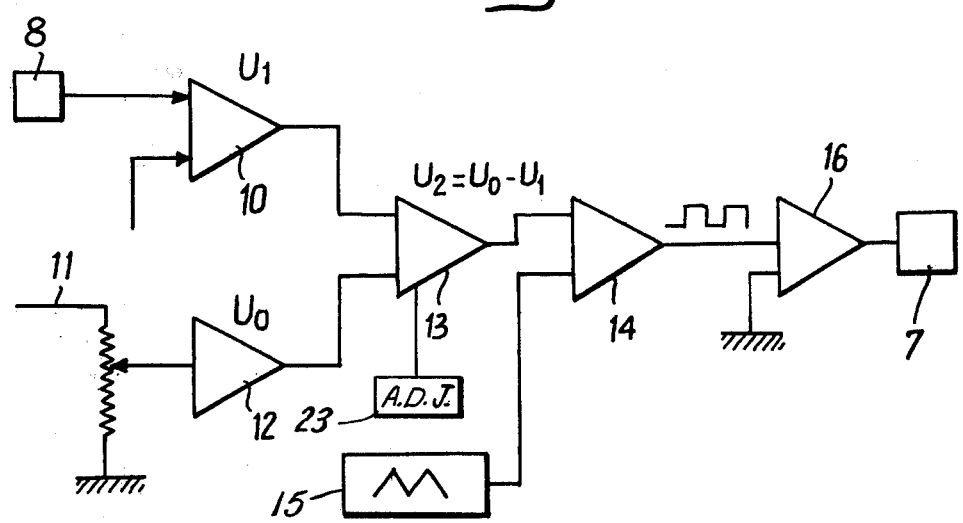
FIG. 2 is a circuit diagram of the device shown in FIG. 1.

The process and device for controlling the electric valve 7 are illustrated in FIG. 2.

The oxygen content or carbon monoxide content of the exhaust gas is measured by the probe 8, for example a solid electrolytic cell ($ZrO_2$).

A reference or regulator voltage is defined. It is preferably substantially equal to the electromotive force which the probe 8 would deliver if the oxygen concentration had the desired value. In other words, the reference voltage supplied at 12 defines the oxygen concentration which it is desired to obtain in the exhaust gas. This voltage can preferably be adjusted at 11.

A filter is preferably provided at 10 to remove interfering voltages from the voltage supplied by the probe 8. The difference E between the voltage from the probe 8 and the stabilized voltage from 12 is measured and amplified at 13. The range of voltages within which these differences can be situated is adjusted by regulating the amplification G produced by this amplifier.

The instantaneous voltage values supplied from 13 and those supplied from the generator 15 which produces triangular signals are compared at 14. The said signals are triangular pulses of fixed amplitude 2U and adjustable frequency T, the values preferably ranging symmetrically on either side of zero and the amplitude ranging from +U to −U.

The following are therefore obtained at the output of the comparator 14:

Either a permanent positive signal if GE is greater than or equal to + U;

or a permanent negative signal if GE is less than or equal to − U;

or dogtooth signals with a fixed frequency of recurrence T and cyclic ratio E/T proportional to E if GE is between − U and + U.

An amplifier 16 delivers to the electric valve 7 signals of the same form but of a suitable power adapted to the electric valve 7.

A permanent positive signal corresponds to a very large excess of CO and causes the electric valve 7 to remain permanently open.

A permanent negative signal corresponds to an excess of oxygen in the exhaust gas and causes the electric valve 7 to remain permanently closed.

Between these two valves, a recurrent and progressive operation of the electric valve is obtained so as to make E as small as possible by means of a suitable choice of dimensions of the auxiliary air inlet 6 and the characteristics of the electric valve 7.

If the carbon monoxide content in the exhaust gas rises, the electric valve 7 tends to remain open for a longer time at each cycle and to correct the mixture so as to lower the carbon monoxide content. The system is therefore self-regulating and the adjustment of the regulating or reference voltage supplied at 12 adjusts the level at which the carbon monoxide content in the exhaust gas is stabilized.

The regulating or reference point may be adjusted by means of a potentiometer as indicated at 11. Experimental adjustment can be achieved by simultaneous observation of the e.m.f. delivered from the probe 8 and the indication of a carbon monoxide analyzer.

The proportional range is also adjustable by means of a potentiometer 23 which adjusts the amplification G of the difference amplifer 13. The optimum proportional range depends on all the characteristics of the device, as well as those of the engine. The adjustment must therefore be made experimentally on prototypes or by trial and error and measurements. A reduction in the width of the range corresponds to an improvement in the degree of fineness of regulation but it also entails the risk of instability. Compromise solutions must therefore be found. During each cycle, the electric valve lifts for a time $t$. If T is the period of the triangular wave $t/T$ is defined by E and the smaller the value of T the smaller is the value of $t$. The frequency or period of the triangular pulse must therefore be adjusted to achieve a sufficient regularity of the rate of flow of auxiliary air but at the same time a good response and steadiness in the time of the electric valve 7 must be achieved, so that again a compromise value is required.

Figure 3:
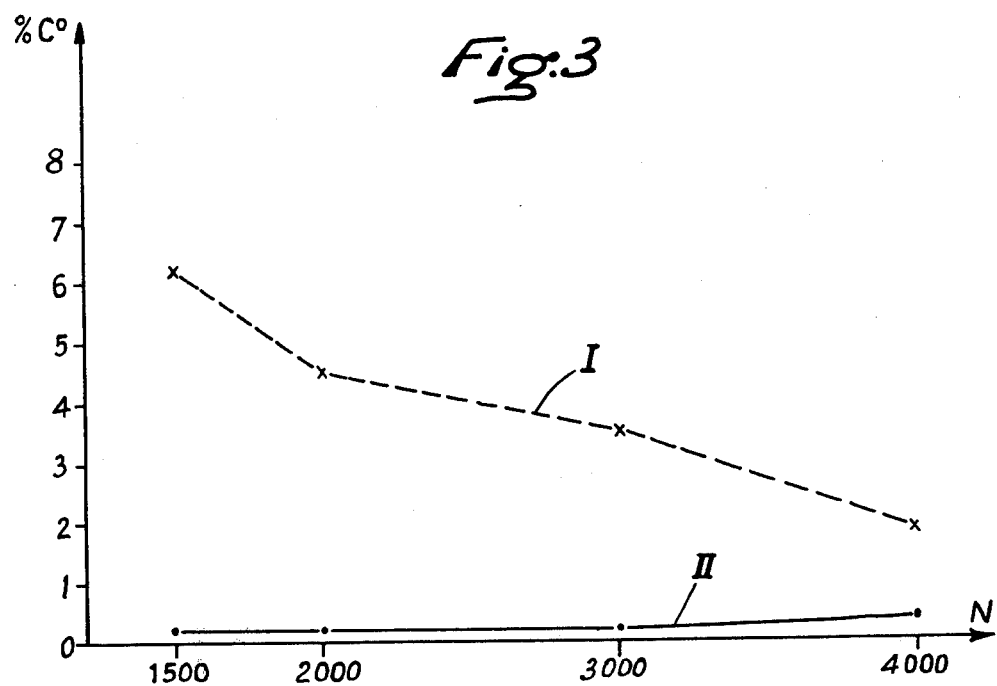
FIGS. 3 and 4 are graphs showing the results obtained.

FIG. 3 shows the percentage of carbon monoxide in the exhaust gas as a function of the number of revolutions N of the engine at normal speeds.

Graph 1 is obtained with a selected engine without the device according to the invention.

Graph II is obtained using the device according to the invention.

Figure 4:
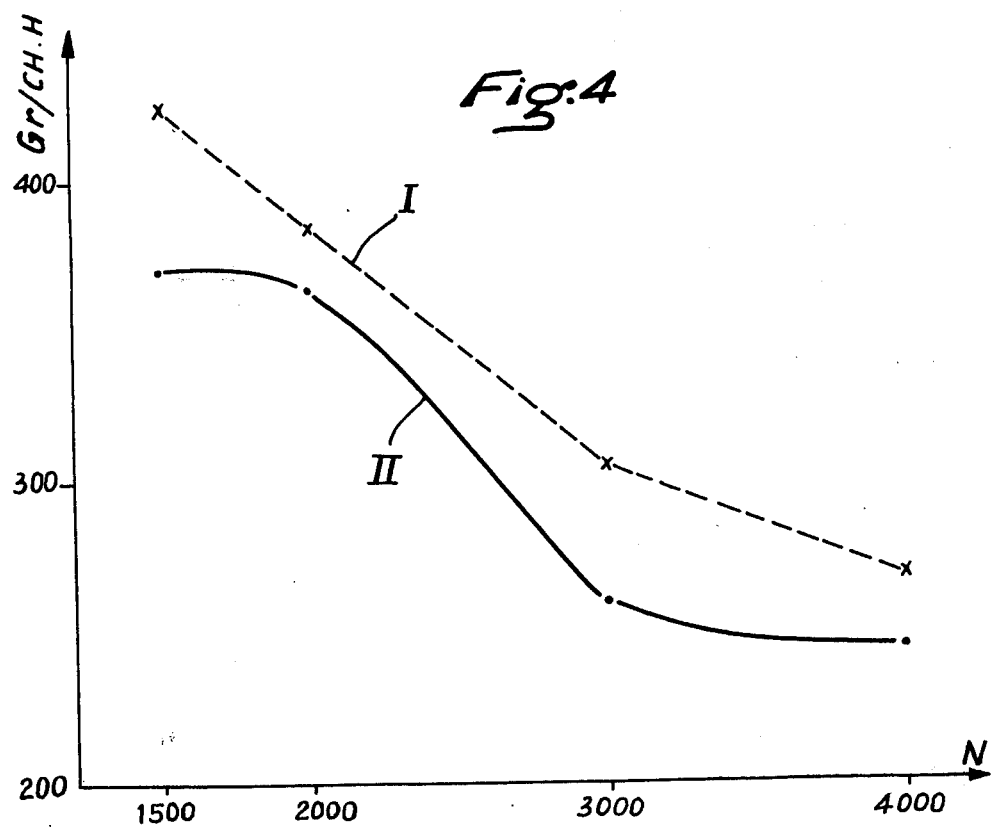

FIG. 4 shows the corresponding specific consumption in gram/horse power/hour, also as a function of the number of revolutions.

It will be seen that graph II represents an average economy of more than 10%.

These graphs are self explanatory and demonstrate the importance and advantages of the invention.

As shown in FIG. 1, a valve 20 is connected to the butterfly valve 21 of the carburettor. This valve 20 introduces a charge loss which increases with the pressure drop in the pipe 3 and thus provides a correction which is a function of the engine speed so that it is possible to differentiate between the engine running at low charge and high velocity and the engine running at high charge and low velocity.

The same result may be obtained with a valve 20 controlled by the pressure drop in the intake pipe by means of a membrane capsule.

A device such as the contact maker 22 connected to the accelerator pedal or to the butterfly valve 21 of the carburettor enables the operation of the electric valve 7 to be stopped when the engine is throttled down or fully accelerated, under which conditions it is necessary to permit an increased carbon monoxide content in the exhaust gas.

The frequency of recurrence chosen for the triangular impulses from 15 may vary within wide limits.

Preferably, however, it corresponds to normal running speeds of the engine and should be of the order of from 5 to 20 Hertz and preferably from 8 to 15 Hertz.

A suitable value for the total amplitude 2U of the triangular pulses is of the order of 4 V.

In the embodiment described above the secondary air inlet is supplied with air from the surrounding atmosphere.

It goes without saying that it may equally well be supplied with air under pressure by means of a pump and that the air will preferably be supplid through a filter as represented at 17 in FIG. 1. In particular, it may have the form of a by-pass short-circuiting the carburettor 2. These known arrangements are included within the scope of the invention.

It is to be understood that the word fuel, in the present description, means all kinds of fuels, including fuel gas.

What is claimed is:

1. Method for controlling a valve for regulating a secondary air inlet opening into the intake pipe of an internal combustion engine, wherein the composition of the exhaust gas is measured by means of a detector which supplies a voltage proportional to this concentration, said voltage is compared with a stabilized voltage, the difference obtained is then compared with pulses produced by a generator producing triangular pulses of fixed amplitude and frequency and after the signal obtained has been amplified it is used to control said valve, the duration of said signals defining the time of opening of said valve.

2. Method according to claim 1, wherein the stabilized voltage is adjustable.

3. Method according to claim 1, wherein said difference between the voltage from the probe and the stabilized voltage is amplified and said amplitude of the triangular pulses is chosen so that for all the values of amplified difference which are smaller than this amplitude, a zone of progressive operation of said valve is obtained, said valve taking up a permanent position when said amplified difference exceeds said amplitude.

4. Method according to claim 3, wherein said amplification of the said difference is adjustable.

5. Method according to claim 1, in which the signals obtained are used to control said valve by means of an adjustable amplifier.

6. Method according to claim 1, in which said repetition frequency of the triangular pulse generator is of from 5 to 20 Hertz.

7. Method according to claim 6, in which said frequency of the triangular pulse generator is from 8 to 15 Hertz.

8. In a device for regulating the composition of a fuel air mixture fed to an internal combustion engine, comprising a secondary air inlet duct opening into the intake pipe and controlled by a valve which is controlled in response to information supplied from a detector situated in the exhaust pipe and measuring the composition of the exhaust gas, the improvement comprising a source of stabilized voltage, a difference amplifying comparator which provides a voltage proportional to the difference between said stabilized voltage and a signal from said detector, a pulse generator which generates triangular pulses of constant amplitude and frequency, a comparator which receives the voltage supplied from said difference amplifying comparator and said triangular pulses, which comparator produces, for all the amplified differences which are smaller in absolute value than the amplitude of the triangular pulses, a signal of which the repetition frequency is equal to that of said sawtooth pulses and the duration of which is variable as a function of the voltage supplied from said difference comparator, whereas for all greater differences it produces a permanent signal, these signals being used to control said valve which controls said secondary air inlet, the duration of said signals defining the time of opening of said valve.

9. Device according to claim 8, wherein means are provided for adjusting said voltage supplied from the source of stabilized voltage.

10. Device according to claim 8, wherein means are provided for adjusting said amplification of the voltage difference supplied by the difference amplifying comparator.

11. Device according to claim 8, wherein the frequency of said triangular pulses is from 5 to 20 Hertz.

12. Device according to claim 11, wherein the frequency of said pulses is from 8 to 15 Hertz.

13. Device according to claim 8, further comprising means for closing said valve when the engine is throttled down or running at full acceleration.

14. Device according to claim 8, further comprising means for introducing into said secondary air inlet a charge loss proportional to the pressure drop prevailing in the intake pipe.

15. Device according to claim 14, wherein said means comprises an auxiliary valve in said secondary air inlet controlled by the pressure drop prevailing in the intake pipe.

16. Device according to claim 14, wherein said means comprises an auxiliary valve in said secondary air inlet controlled by the throttle of the carburettor.

* * * * *